United States Patent [19]

Pires

[11] Patent Number: 4,618,880
[45] Date of Patent: Oct. 21, 1986

[54] METHOD AND APPARATUS FOR SYNCHRONIZING A PLURALITY OF TELEVISION SIGNALS

[76] Inventor: H. George Pires, 20 Surrey La., Parlin, N.J. 08859

[21] Appl. No.: 588,393

[22] Filed: Mar. 12, 1984

[51] Int. Cl.$^4$ ...................... H04N 17/04; H04N 5/073
[52] U.S. Cl. ...................................... 358/10; 358/139; 358/149
[58] Field of Search ................ 358/10, 139, 148, 149, 358/158, 17, 19

[56] References Cited

U.S. PATENT DOCUMENTS

| | | | |
|---|---|---|---|
| 4,388,637 | 6/1983 | Blair | 358/10 |
| 4,454,530 | 6/1984 | Yoshinaka | 358/10 |
| 4,532,547 | 7/1985 | Bennett | 358/149 |

*Primary Examiner*—Michael A. Masinick
*Attorney, Agent, or Firm*—Erwin S. Teltscher

[57] ABSTRACT

When the output of a number of color television signal generators is to be combined, all of these outputs must be correctly timed with respect to one another. To accomplish this, the output of a signal generator is applied to a phase-adjusting device and then to a sync separator. Horizontal synchronization pulses and/or color bursts are separated from the signal and applied to a switcher which alternately supplies these synchronization signals and reference synchronization signals to an adder circuit. The other input of the adder receives the incoming signal without the synchronization signals to be timed. The output of the adder is thus the incoming television signal, but with reference synchronization pulses substituted for its synchronization pulses half the time. The output of the adder is then applied to a monitor. The display on the monitor has a distinct flicker when the synchronization pulses of the incoming signal are not in phase with the reference synchronization pulses. An operator then removes the flicker by adjusting the phase-adjusting device. If the switches controlled by an oscillator having a randomly varying frequency, the display on the monitor will be scrambled and the phase will be adjusted to unscramble the picture.

10 Claims, 3 Drawing Figures

METHOD AND APPARATUS FOR SYNCHRONIZING A PLURALITY OF TELEVISION SIGNALS

FIELD OF THE INVENTION

The present invention relates to the synchronization of a plurality of television signals to be viewed in sequence. In particular, it concerns the timing of various signal generators furnishing outputs to be combined to constitute a single color television signal.

BACKGROUND OF THE INVENTION

One of the major problems in installing a color television system is timing the various signal generators whose outputs, linked by switching and/or mixing processes will constitute the final color television signal. If these signals are not correctly timed, that is if they do not arrive at the switching device exactly in phase with one another, a number of problems will be encountered. One of the problems include visible color changes and/or horizontal shifts when the operator attempts to perform a mix or a wipe.

Currently, timing of the system is usually performed manually. The outputs of all signal generators are connected to respective inputs of the switching device. The output of a reference synchronization signal source, usually internal to the switching device, is monitored by means of a cathode ray oscilloscope. Thereafter, each input device is monitored in turn and adjusted for phase coincidence with the reference synchronization signals. This is a laborious procedure, requiring special equipment, and is usually performed by trained personnel.

SUMMARY OF THE INVENTION

It is an object of the present invention to furnish a method and apparatus allowing the above-described timing to be carried out with untrained personnel and without special equipment.

The present invention is a method for synchronizing an incoming television signal having incoming synchronizing signals such as horizontal synchronization pulses and color bursts, to a reference television signal having reference synchronizing signals but "black" picture signals. Specifically, the reference synchronizing signals are substituted for the incoming synchronization signals at a selected rate and for a selected time interval, thereby creating a test signal. The test signals are applied to a television monitor. Proper selection of the rate and the time interval causes a constant flicker in the monitor display when the incoming signal is not correctly timed relative to the reference signal. The operator can then achieve the correct timing simply by adjusting the phase of the incoming television signal until the flicker disappears.

More specifically, the flicker will be a color flicker when the color burst of the incoming television signal is incorrectly timed with respect to the reference burst, and will be a line flicker for incorrect timing of the horizontal synchronization signal.

The novel features which are considered as characteristic for the invention are set forth in particular in the appended claims. The invention itself, however, both as to its construction and its method of operation, together with additional objects and advantages thereof will best be understood from the following description of specific embodiments when read in connection with the accompanying drawing.

DESCRIPTION OF THE PREFERRED EMBODIMENT

Figure 1:
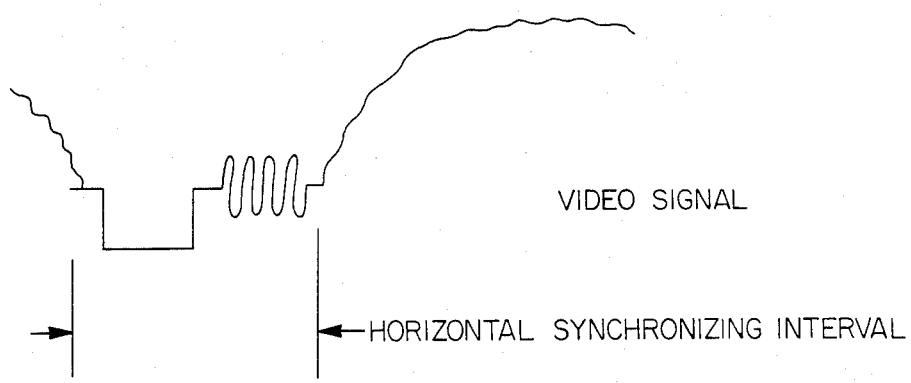
FIG. 1 is a schematic diagram illustrating a horizontal line interval of the incoming television signal.
Figure 2:
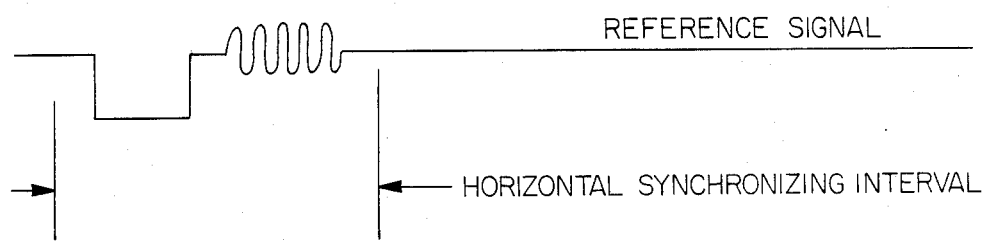
FIG. 2 is a schematic diagram showing the horizontal line interval of the reference television signal.
Figure 3:
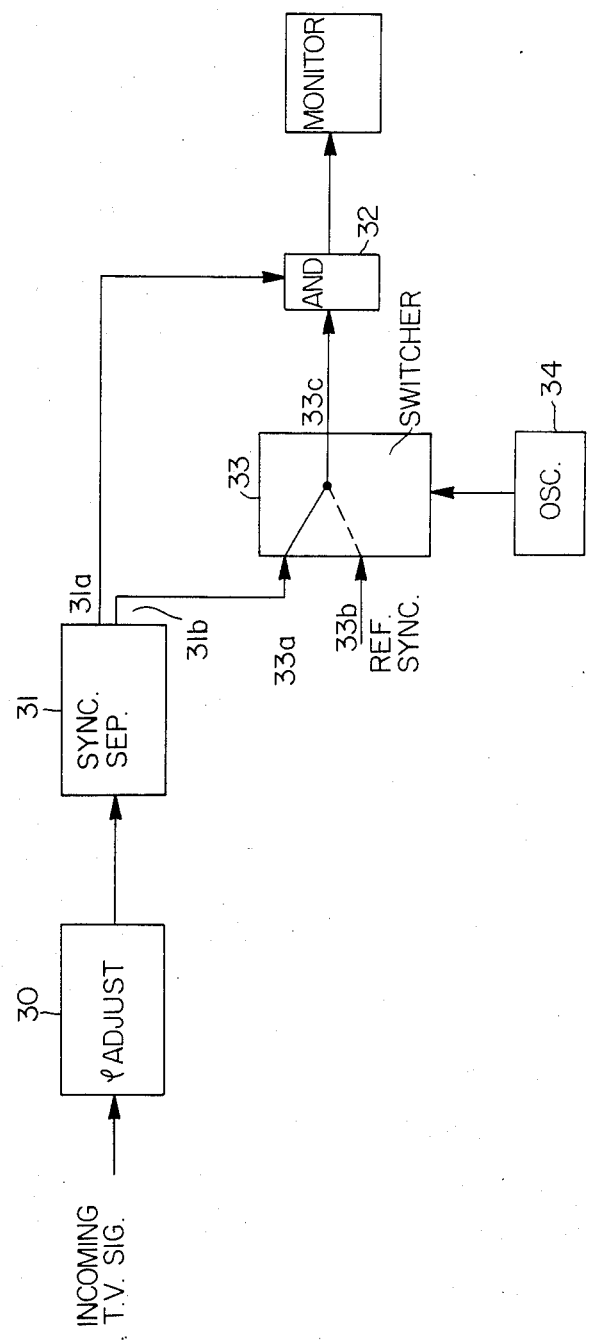
FIG. 3 is a schematic block diagram of the equipment required to carry out the present invention.

FIG. 1 illustrates an incoming television signal. This is not necessarily a signal from a remote pick-up, but may be the output of a video cassette recorder or other locally generated signal. The horizontalsynchronizing interval contains the horizontal synchronization pulse, and a color burst situated on the back porch of that pulse. The color burst is followed by the actual picture information which occupies the remainder of the horizontal line. The reference television signal illustrated in FIG. 2 is identical to that shown in FIG. 1, except that the picture information is a constant "black." To prevent a horizontal shift as a result of a mix or a wipe, it is necessary that the horizontal synchronization pulses be in synchronism with each other. To prevent a visible color change, the color bursts must be in phase.

To carry out the synchronization both for the horizontal synchronization pulses and for the color bursts, the incoming television signal is applied to the input of a standard phase-adjustable device 30. This device has a "subcarrier phase" control for adjusting the timing of the color burst and a "horizontal phase" control for adjusting the timing of the horizontal synchronization pulse. The output of the phase-adjuster 30 is applied to the input of a sync separator 31. Again, this is a standard unit which allows selective separation of the horizontal synchronization pulse and/or the color burst. The incoming television signal, without the so-separated synchronization signals is available at an output 31(a). Output 31(a) is connected to an input 32(a) of an adder circuit 32. The synchronization signals separated from the incoming television signal are available at an output 31(b) of sync separator 31. They are applied to an input 33(a) of an electronically controlled switching unit 33. Unit 33 is a standard switcher and, in general, supplies an internally generated reference signal, including all synchronization signals and a signal "black." For purposes of clarity, the reference synchronization signal derived from this reference signal is illustrated as being applied at a second input 33(b) of switcher 33. Input 33(a) and 33(b) are selectively connected to the output 33(c) of switcher 33 under control of an oscillator 34. Output 33(c) of switcher 33 is connected to the second input, 32(b) of adder circuit 32. The output of adder circuit 32 is connected to the display input of a monitor 34.

The above-described apparatus operates as follows:

Let it be assumed first that sync separator 31 separates only the horizontal synchronization pulses from the incoming television signal, i.e. from the signal which is to be synchronized to the reference signal. The signal at terminal 31(a) will then be the full incoming television signal, but without the horizontal synchronization signals. The latter will appear at terminal 31(b) and are applied to switcher 33. Application of the output of oscillator 34 to the control input of switcher 33 causes the horizontal synchronization signal from the incoming television signal to alternate with the reference horizontal synchronization signal at output 33(*c*). These signals will thus be alternately added to the remaining incoming television signal in adder circuit 32. The output of adder circuit 32 is thus a television signal whose picture information is transmitted to monitor 34, but with a reference synchronization signal substituted for its own synchronization signal for one half the period of oscillator 34. Unless the two synchronization signals are exactly in phase, there will be a visible line flicker on the display of monitor 34. The operator then adjusts the horizontal phase control on phase adjuster 30 until this flicker disappears.

The same operation can take place if sync separator 31 is set to separate out the color burst. The only difference will be that the flicker then appearing on monitor 34 will be a color flicker, not a line flicker. It is even possible that both synchronization signals, the horizontal synchronization signal and the color burst, be separated from the incoming television signal and compared to the corresponding components of the reference signal in one operation.

It is evident that even an inexperienced operator can readily adjust the controls on the phase-adjuster until such time as both types of flicker disappear on the monitor. It is only necessary that the frequency of oscillator 34 be so selected that it is sufficiently low that the eye of the person observing the monitor does not blend the images into a steady picture, and yet fast enough that the flicker is always visible. An oscillator frequency of between 25 and 75 cycles per second has been found adequate, with a 60 cycle per second rate being preferred.

Another alternative is for oscillator 34 to be a random frequency oscillator, rather than a fixed frequency. This type of operation will produce a scrambled image if the timing of the incoming signal relative to the reference signal is incorrect. Adjusting the phase of the incoming signal will then cause a gradual change into a normal display.

While the invention has been illustrated in preferred embodiments, it is not to be limited to the circuits and structures shown, since many variations thereof will be evident to one skilled in the art and are intended to be encompassed in the present invention as set forth in the following claims.

I claim:

1. Method for synchronizing an incoming television signal having incoming synchronization signals to a reference television signal having reference synchronization signals, comprising the steps of substituting said reference synchronization signals for said incoming synchronization signals at a selected rate and for selected time intervals, thereby creating a test signal;

applying said test signal to a television monitor thereby creating a visual monitor output signal, said selected rate and time intervals being adapted to create a constant flicker in said monitor output signal in response to lack of synchronization between said incoming synchronization signals and said reference synchronization signals; and adjusting the phase of said incoming synchronization signals to remove said flicker from said monitor output signal.

2. A method as set forth in claim 1, wherein said reference synchronization signals and said incoming synchronization signals are horizontal synchronization signals, and said flicker is a horizontal line flicker.

3. A method as set forth in claim 2, wherein said incoming television signal and said reference television signal are color television signals, said incoming and reference synchronization signals further comprise, respectively, reference and incoming color bursts, and wherein said flicker comprises a color flicker and said horizontal line flicker.

4. A method as set forth in claim 1, wherein said selected rate is between 25 and 65 times per second.

5. A method as set forth in claim 4, wherein said selected time interval is one half of the total time interval corresponding to said selected rate.

6. A method as set forth in claim 1, wherein said selected rate is a random rate varying between predetermined limit rates.

7. Apparatus for synchronizing an incoming television signal having incoming synchronization signals to a locally generated reference television signal having reference synchronization signal and no picture signal in a television studio having a television monitor, phase adjusting apparatus, and a switcher having a first, second and control input terminal and an output terminal, comprising means for applying said incoming television signal to said phase adjusting apparatus, thereby creating a phase-adjustable television signal;

connecting means for applying said phase adjustable television signal and said reference television signal to said first and second input terminal respectively;

control means connected to said control input terminal for alternately connecting said output terminal to said first and second input terminal at a preselected rate and for preselected time intervals, thereby creating a test signal alternately having said incoming synchronization signals and said reference synchronization signals at said output terminal of said switcher;

means for applying said test signal to said television monitor, whereby said monitor furnishes a visual output signal having a flicker removable by operator-controlled adjustment of said phase-adjusting apparatus to synchronize said incoming synchronization signals to said reference synchronization signals.

8. Apparatus as set forth in claim 7, wherein said control means comprises an oscillator oscillating at a predetermined rate between 25 and 70 cycles per second.

9. Apparatus as set forth in claim 8, wherein said oscillator oscillates at 60 cycles per second.

10. Apparatus as set forth in claim 7, further comprising means for randomly varying said preselected rate, whereby said visual output signal is a scrambled signal unscrambled by said operator-controlled adjustment.

* * * * *